US010789972B2

(12) United States Patent
Yuyama et al.

(10) Patent No.: US 10,789,972 B2
(45) Date of Patent: Sep. 29, 2020

(54) APPARATUS FOR GENERATING RELATIONS BETWEEN FEATURE AMOUNTS OF AUDIO AND SCENE TYPES AND METHOD THEREFOR

(71) Applicant: Yamaha Corporation, Hamamatsu-shi, Shizuoka-Ken (JP)

(72) Inventors: Yuta Yuyama, Hamamatsu (JP); Keita Arimoto, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 0 days.

(21) Appl. No.: 16/550,404

(22) Filed: Aug. 26, 2019

(65) Prior Publication Data
US 2019/0378534 A1     Dec. 12, 2019

Related U.S. Application Data

(63) Continuation of application No. PCT/JP2018/006174, filed on Feb. 21, 2018.

(30) Foreign Application Priority Data

Feb. 27, 2017  (JP) ................................ 2017-035367

(51) Int. Cl.
*G10L 25/48* (2013.01)
*G06F 16/60* (2019.01)
(Continued)

(52) U.S. Cl.
CPC ............. *G10L 25/57* (2013.01); *G06F 16/61* (2019.01); *G06N 7/005* (2013.01); *G06N 20/00* (2019.01); *G10L 25/27* (2013.01)

(58) Field of Classification Search
CPC ......... G10L 25/00; G10L 25/27; G10L 25/48; G10L 25/51; G10L 25/54; G10L 25/57;
(Continued)

(56) References Cited

U.S. PATENT DOCUMENTS

| 2002/0172420 | A1  | 11/2002 | Nicolas |
| 2005/0254780 | A1* | 11/2005 | Takemura ............ G11B 27/031 386/241 |

(Continued)

FOREIGN PATENT DOCUMENTS

| JP | 2009-296274 A | 12/2009 |
| JP | 2010-11409 A  | 1/2010  |

(Continued)

OTHER PUBLICATIONS

International Search Report (PCT/ISA/210) issued in PCT Application No. PCT/JP2018/006171 dated May 15, 2018 with English translation (five pages).

(Continued)

*Primary Examiner* — Thang V Tran
(74) *Attorney, Agent, or Firm* — Crowell & Moring LLP

(57) ABSTRACT

An apparatus for generating relations between feature amounts of audio and scene types includes at least one processor and a memory. Upon execution of the instructions the processor is caused to set one of the scene types in accordance with an instruction from a user to indicate one of clusters classifying the feature amounts of audio in one or more pieces of content. The processor is also caused to generate a plurality of pieces of learning data, each representative of a feature amount, from among the feature amounts, that belongs to the cluster and the scene type set for the cluster. The processor is also caused to generate an identification model representative of relations between the feature amounts of audio and the scene types by performing machine learning using the plurality of pieces of learning data.

9 Claims, 5 Drawing Sheets

(51) Int. Cl.
*G06F 3/16* (2006.01)
*G06N 20/00* (2019.01)
*G10L 25/57* (2013.01)
*G06F 16/61* (2019.01)
*G06N 7/00* (2006.01)
*G10L 25/27* (2013.01)

(58) Field of Classification Search
CPC ......... G10L 25/72; G06F 16/00; G06F 16/60; G06F 16/61; G06F 16/65; G06F 17/00; G06F 3/16; G06N 20/00; G06N 7/00; G06N 7/005; H04S 7/00; H04R 3/00; H04R 2203/00
See application file for complete search history.

(56) References Cited

U.S. PATENT DOCUMENTS

| | | | |
|---|---|---|---|
| 2009/0080853 A1* | 3/2009 | Chen | G11B 27/28 386/241 |
| 2009/0304088 A1* | 12/2009 | Kodaka | H04N 5/147 375/240.25 |
| 2012/0033933 A1 | 2/2012 | Suzuki | |
| 2012/0050570 A1* | 3/2012 | Jasinski | G11B 27/28 348/231.4 |
| 2012/0057775 A1* | 3/2012 | Suzuki | H04N 5/76 382/154 |
| 2013/0314599 A1 | 11/2013 | Kikugawa | |
| 2014/0314269 A1* | 10/2014 | Chen | G06K 9/00335 382/103 |
| 2015/0058877 A1* | 2/2015 | Lakkundi | H04N 21/439 725/19 |
| 2015/0207865 A1* | 7/2015 | Hsieh | G06Q 10/109 715/716 |
| 2017/0017844 A1* | 1/2017 | Jeong | G06K 9/00718 |
| 2017/0105080 A1* | 4/2017 | Das | G10L 99/00 |
| 2017/0171674 A1* | 6/2017 | Fung | H04R 25/507 |

FOREIGN PATENT DOCUMENTS

| | | |
|---|---|---|
| JP | 2010-230972 A | 10/2010 |
| JP | 2011-95680 A | 5/2011 |
| JP | 2013-243619 A | 12/2013 |
| JP | 2015-42006 A | 3/2015 |

OTHER PUBLICATIONS

Japanese-language Written Opinion (PCT/ISA/237) issued in PCT Application No. PCT/JP2018/006171 dated May 15, 2018 (five pages).

International Search Report (PCT/ISA/210) issued in PCT Application No. PCT/JP2018/006174 dated May 1, 2018 with English translation (four pages).

Japanese-language Written Opinion (PCT/ISA/237) issued in PCT Application No. PCT/JP2018/006174 dated May 1, 2018 (four pages).

Non-Final Office Action issued in U.S. Appl. No. 16/550,833 dated Apr. 3, 2020 (14 pages).

Japanese language Office Action issued in counterpart Japanese Patent Application No. 2019-501368 dated Aug. 4, 2020 with English translation eight (8) pages.

* cited by examiner

APPARATUS FOR GENERATING RELATIONS BETWEEN FEATURE AMOUNTS OF AUDIO AND SCENE TYPES AND METHOD THEREFOR

CROSS REFERENCE TO RELATED APPLICATIONS

This application is a Continuation Application of PCT Application No. PCT/JP2018/006174, filed Feb. 21, 2018, and is based on and claims priority from Japanese Patent Application No. 2017-035367, filed Feb. 27, 2017, the entire content of which is incorporated herein by reference.

BACKGROUND INFORMATION

Technical Field

The present disclosure concerns a technology that relates to analysis of content including video and audio.

Description of Related Art

Conventionally, various technologies for analyzing different scenes within content, such as a video work or the like, (hereafter, "scene type") have been proposed. For example, Japanese Patent Application Laid-Open Publication No. 2009-296274 (hereafter, JP 2009-296274) discloses a technology for analyzing various scene types, such as a conversation scene, a race scene, and the like, from streamed video content.

However, since relations between scene types and tendency in video in content vary greatly, it is not always possible to accurately identify a particular scene type in a video stream.

SUMMARY

In consideration of the situation described above, an object of one aspect of the present disclosure is to appropriately identify a scene type of content.

In order to solve the problem described above, an apparatus for generating relations between feature amounts of audio and scene types according to an aspect of the invention includes at least one processor and a memory. Upon execution of the instructions the processor is caused to set one of the scene types in accordance with an instruction from a user to indicate one of clusters classifying the feature amounts of audio in one or more pieces of content. The processor is also caused to generate a plurality of pieces of learning data, each representative of a feature amount, from among the feature amounts, that belongs to the cluster and the scene type set for the cluster. The processor is also caused to generate an identification model representative of relations between the feature amounts of audio and the scene types by performing machine learning using the plurality of pieces of learning data.

A method for generating relations between feature amounts of audio and scene types includes setting one of the scene types in accordance with an instruction from a user to indicate one of clusters classifying the feature amounts of audio in one or more pieces of content. The method for generating relations between feature amounts of audio and scene types also includes generating a plurality of pieces of learning data, each representative of a feature amount, from among the feature amounts, that belongs to the cluster and the scene type set for the cluster.

BRIEF DESCRIPTION OF THE DRAWINGS

Other objects, advantages, and novel features of the present invention will become apparent from the following description of one or more embodiments when considered in conjunction with the accompanying drawings, in which.

DESCRIPTION OF THE EMBODIMENTS

Figure 1:
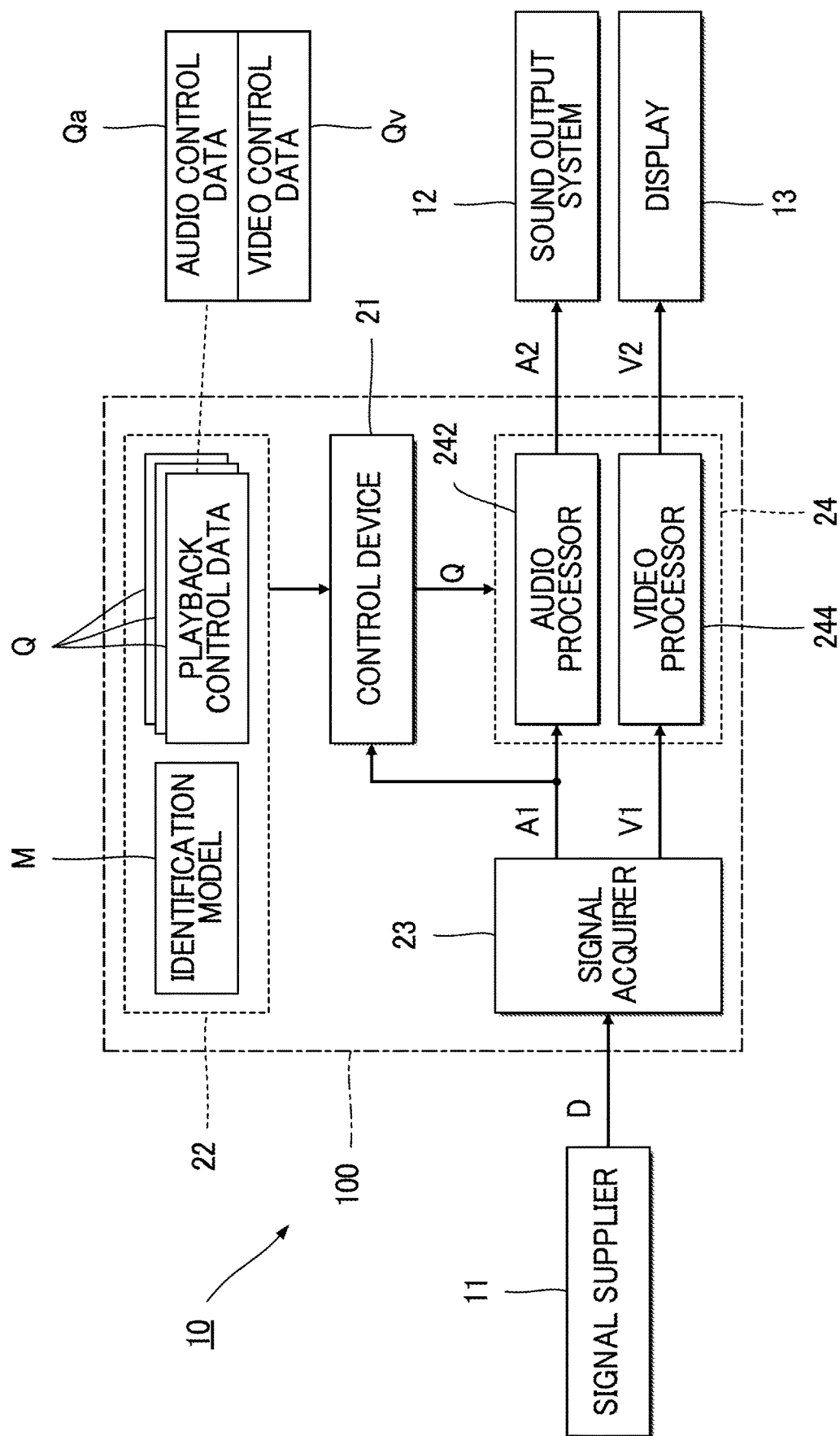
FIG. 1 is a block diagram of an AV system.

FIG. 1 is a block diagram of an audio-visual (AV) system 10 according to an embodiment of the present disclosure. The AV system 10 according to the embodiment is a computer system for playing back content that includes video and audio. The content, for example, is a video work, such as a movie, a sports video, a live-event video, a music video, a game, or the like. As shown in FIG. 1, the AV system 10 according to the embodiment includes an information processing apparatus 100, a signal supplier 11, a sound output system 12, and a display 13.

The signal supplier 11 supplies content data D representative of content that includes video and audio to the information processing apparatus 100. In some embodiments, the signal supplier 11 may be a playback device that acquires content data D from a recording medium of a portable type or a built-in type and outputs the acquired content data D to the information processing apparatus 100, for example. In some embodiments, a communication device that receives content data D transmitted by a server apparatus (not shown) from a communication network, such as the Internet, may be used as the signal supplier 11, for example.

The information processing apparatus 100 according to the embodiment is a computer system (content processing apparatus) that processes the content data D supplied from the signal supplier 11, and includes a control device 21, a storage device 22, a signal acquirer 23, and a playback controller 24. In some embodiments, the information processing apparatus 100 may be realized using apparatuses prepared as separate bodies.

The signal acquirer 23 is an interface that receives the content data D from the signal supplier 11. The signal acquirer 23 according to the embodiment extracts an audio signal A1 and a video signal V1 from the content data D supplied from the signal supplier 11. The audio signal A1 is a signal representative of audio that constitutes content (for example, a conversation sound, an effect sound, a sound of musical performance, or the like in a video work). The audio signal A1 according to the embodiment is configured in N channels (for example, 5.1 channels). The video signal V1 is a signal representative of video that constitutes the content.

The playback controller 24 processes the audio signal A1 and the video signal V1. More specifically, the playback controller 24 adjusts the audio signal A1 and the video signal V1 by performing signal processing using playback control data Q. The playback control data Q is data for controlling playback of content. As shown in FIG. 1, the playback control data Q according to the embodiment includes audio control data Qa and video control data Qv. The audio control data Qa is data for controlling playback of audio included in content and, for example, includes parameters for controlling a sound field (for example, a virtual sound image localization position) formed by the audio in the content. The video control data Qv is data for controlling playback of video included in content and, for example, includes parameters for controlling video characteristics, such as brightness, contrast, and the like of an image.

As shown in FIG. 1, the playback controller 24 according to the embodiment includes an audio processor 242 and a video processor 244. The audio processor 242 generates an audio signal A2 by processing the audio signal A1 supplied from the signal acquirer 23. The audio processor 242 according to the embodiment generates the audio signal A2 of N channels by performing sound field control using the audio control data Qa. The sound field control is audio processing for adjusting sound field characteristics, such as reverberation characteristics within a virtual space perceived by a listener. For example, the audio processor 242 generates reverberation sounds (an early reflection sound and a late reverberation sound) with respect to multiple audio paths within a virtual space in accordance with the audio control data Qa and mixes a signal representative of multiple reverberation sounds into the audio signal A1, thereby generating the audio signal A2. The total number of channels for the audio signal A1 may differ from that for the audio signal A2. The video processor 244 generates a video signal V2 by processing the video signal V1 supplied from the signal acquirer 23. More specifically, the video processor 244 generates the video signal V2 by performing image processing using the video control data Qv.

The sound output system 12 is, for example, an N-channel surround system configured by N speaker devices and outputs a sound represented by the audio signal A2 of N channels supplied from the audio processor 242. The display 13 is configured, for example, by a liquid crystal display panel and displays video represented by the video signal V2 supplied from the video processor 244.

The control device 21 is configured to include, for example, processing circuitry, such as a central processing unit (CPU) and the like, and integrally controls each element of the information processing apparatus 100. The storage device 22 stores a computer program executed by the control device 21 and various kinds of data used by the control device 21. For example, a known recording medium, such as a semiconductor recording medium or a magnetic recording medium, or a combination of multiple types of recording media may be freely selected for employment as the storage device 22. The storage device 22 (for example, a cloud storage) may be provided separately from the information processing apparatus 100, and the control device 21 may execute data reading and writing from and into the storage device 22 via a communication network, such as the Internet.

Figure 2:
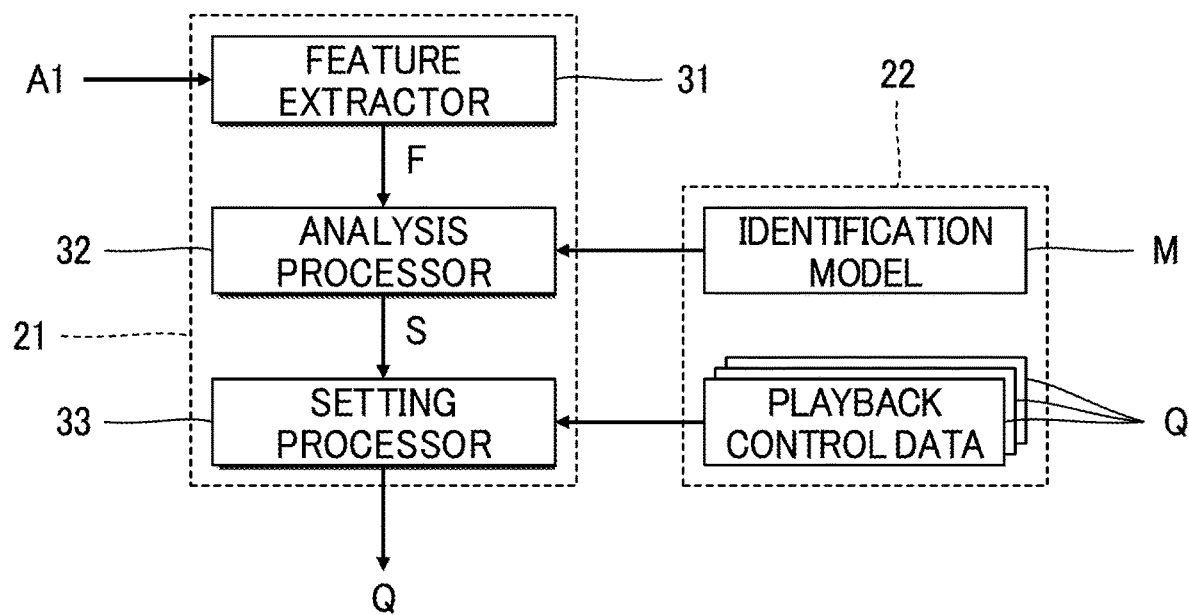
FIG. 2 is a block diagram focusing on the function of an information processing apparatus.

FIG. 2 is a block diagram focusing on the function of the control device 21. As shown in FIG. 2, by executing a computer program stored in the storage device 22, the control device 21 according to the embodiment includes functionality of elements (a feature extractor 31, an analysis processor 32, and a setting processor 33) for setting playback control data Q used by the playback controller 24. A part of the functions of the control device 21 may be realized by using dedicated electronic circuitry, or the functions of the control device 21 may be distributed among different devices. Furthermore, a part or all of the functions of the playback controller 24 may be realized by the control device 21.

The feature extractor 31 extracts a feature amount F relating to audio in content. More specifically, the feature extractor 31 extracts a feature amount F by analyzing the audio signal A1 supplied from the signal acquirer 23. Extraction of a feature amount F by the feature extractor 31 is sequentially executed for each unit period. A unit period is a period of a predetermined time length (for example, several hundreds of milliseconds).

The feature amount F according to the embodiment is a vector (feature vector) in which N elements corresponding to different N channels are arranged. Any one element composing a vector representative of a feature amount F represents a feature relating to frequency characteristics of a channel that corresponds to that element of the audio signal A1. More specifically, Mel-Frequency Cepstrum Coefficients (MFCC) extracted from one channel of the audio signal A1 may be employed as an element corresponding to the channel within the feature amount F. For example, a feature amount F is a vector composed of (U×N) elements in which U-dimensional vectors (a series of U coefficients) representative of MFCC are arranged for N channels (here, U is a natural number). As will be understood from the foregoing description, the feature amount F according to the embodiment is an index representative of a feature of a sound field realized by an audio signal A1 of N channels (in other words, a feature of frequency characteristics for each of the N channels).

The analysis processor 32 identifies a scene type S of content depending on a feature amount F of audio in content. The scene type S is a classification (category) of a scene represented by content. For example, one of scene types S including a standard, a spectacle, Sci-Fi, adventure, drama, a music video, and the like is identified by the analysis processor 32. The feature of a sound field realized by an N-channel audio signal A1 tends to depend on the scene type S of content. For example, in a "drama" scene in which words of characters are important, a feature amount F that is unique to a voice tends to be dominant. On the other hand, in a broad "spectacle" scene, a complex feature amount F in which all the N channels together represent frequency characteristics that are unique to various kinds of mixed sounds or effect sounds, such as an explosion sound and so on, tends to be dominant. Considering the tendencies described above, the feature amount F extracted by the feature extractor 31 is valid as an index for use by the analysis processor 32 in identifying a scene type S. Identification of a scene type S by the analysis processor 32 is sequentially executed for each extraction of a feature amount F by the feature extractor 31 (in other words, for each unit period). As will be understood from the foregoing description, in contrast to the technology described in JP 2009-296274, in which a scene type is identified depending on video in content, the analysis processor 32 according to the embodiment identifies a scene type S in accordance with audio in content.

As shown in FIG. 2, an identification model M is stored in the storage device 22. The analysis processor 32 according to the embodiment identifies a scene type S of content by use of the identification model M stored in the storage device 22. The identification model M is a pattern recognition model that represents relations between feature amounts F of audio and scene types S. The identification model M according to the embodiment is a support vector machine (SVM) that is a representative example of a statistical model that uses supervised learning. The identification model M is generated in advance by way of machine learning of tendency relations between feature amounts F and scene types S in existing voluminous content pieces. More specifically, the analysis processor 32 determines to which one of two scene types S a feature amount F of audio in content corresponds, by using a hyper-plane determined by machine learning. By repeating determination a multiple number of times while changing combinations of the two scene types S, a single scene type S is identified. In other words, using relations between feature amounts F and scene types S in existing voluminous content pieces, a single scene type S is estimated that has a highest likelihood for the feature amount F extracted by the feature extractor 31.

The setting processor 33 sets playback control data Q of content in accordance with the scene type S identified by the analysis processor 32. As shown in FIG. 2, the storage device 22 according to the embodiment stores pieces of playback control data Q corresponding to different scene types S. A piece of playback control data Q that corresponds to any one scene type S designates a numerical value suitable for the scene type S for each of parameters relating to the playback of content. The setting processor 33 retrieves, from the storage device 22, playback control data Q corresponding to the scene type S identified by the analysis processor 32 from among multiple pieces of playback control data Q stored in the storage device 22. The setting processor 33 then indicates, to the playback controller 24, the playback control data Q (audio control data Qa and video control data Qv) retrieved from the storage device 22. Accordingly, the content is played back with sound field characteristics and video characteristics in accordance with the scene type S of the content. In the embodiment, a scene type S is identified for each unit period, and the sound field characteristics and the video characteristics are updated for each content scene.

Figure 3:
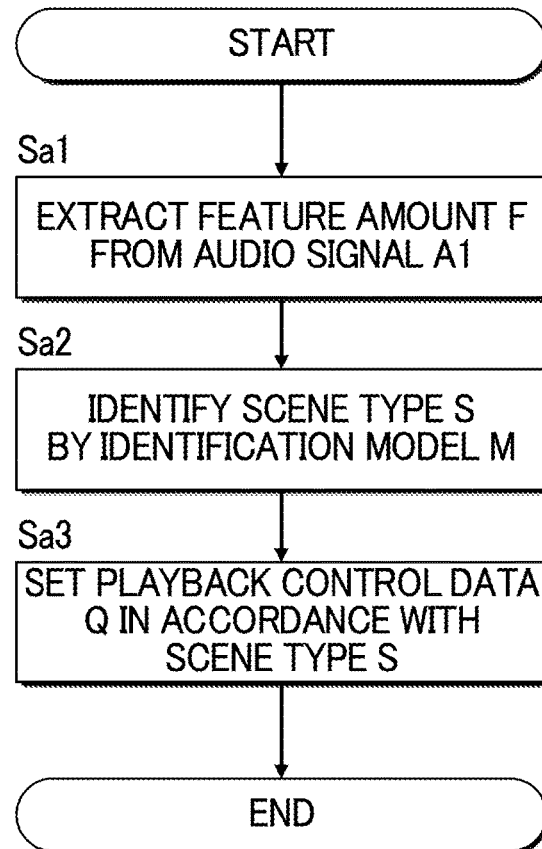
FIG. 3 is a flowchart showing a process executed by a control device.

FIG. 3 is a flowchart illustrating a process executed by the control device 21 according to the embodiment (an example of an information processing method). The process illustrated in FIG. 3 is executed for each unit period. For example, the process illustrated in FIG. 3 is executed in real time in parallel with supply of content data D by the signal supplier 11 and playback of content by the sound output system 12 and the display 13.

When the process illustrated in FIG. 3 starts, the feature extractor 31 extracts a feature amount F from within a part corresponding to a unit period of an audio signal A1 supplied from the signal acquirer 23 (Sa1). The analysis processor 32 identifies a scene type S for the unit period by assigning (feeding) the feature amount F extracted by the feature extractor 31 to the identification model M (Sa2).

When the scene type S is identified in the above procedure, the setting processor 33 sets playback control data Q of the content in accordance with the scene type S (Sa3). More specifically, the setting processor 33 retrieves a piece of playback control data Q that corresponds to the scene type S from among pieces of playback control data Q stored in the storage device 22 and indicates the retrieved playback control data Q (the audio control data Qa and the video control data Qv) to the playback controller 24.

The audio processor 242 of the playback controller 24 generates an audio signal A2 of N channels by executing sound field control on the audio signal A1 in accordance with the audio control data Qa set by the control device 21. The audio signal A2 is supplied to the sound output system 12. Accordingly, audio in the content is output from the sound output system 12 with sound field characteristics that accord with the scene type S. The video processor 244 of the playback controller 24 generates a video signal V2 by executing image processing on the video signal V1 in accordance with the video control data Qv set by the control device 21. The video signal V2 is supplied to the display 13. Accordingly, video in the content is displayed on the display 13 with video characteristics that accord with the scene type S.

As has been described above, in the embodiment, a scene type S is identified in accordance with a feature amount F of audio in content, and accordingly, even in a case where the scene type S cannot be accurately identified from video in the content, the scene type S of the content can be identified. In the embodiment, in particular, the identification model M, which is representative of relations between feature amounts F of audio and scene types S, is used for identifying a scene type S. Accordingly, assuming a tendency existing between feature amounts F and scene types S, a scene type S having a highest likelihood of having a feature amount F extracted by the feature extractor 31 can be identified.

In addition, since playback control data Q for controlling playback of content is set in accordance with a scene type S, content can be played back with characteristics that are appropriate for the scene type S of the content. For example, in the embodiment, audio control data Qa for controlling a sound field comprises audio in content that accords with a scene type S. Thus, audio in content can be played back with a sound field that is appropriate for the scene type S of the content.

In the embodiment, a scene type S is identified by using a feature amount F, which is in the form of a vector that includes elements corresponding to frequency characteristics (for example, MFCC) of N-channel audio signals A1. In other words, a feature amount F representative of features of a sound field realized by the audio signal A1 of N channels is used for identifying a scene type S. Accordingly, with a tendency whereby the feature of a sound field realized by an N-channel audio signal A1 depends on a scene type S, a scene type S can be highly accurately determined.

In each refinement described below, like reference signs used in the description of the above embodiment will be used to denote elements having functions and actions similar to those of the above embodiment, and detailed description thereof will be omitted as appropriate.

Figure 4:
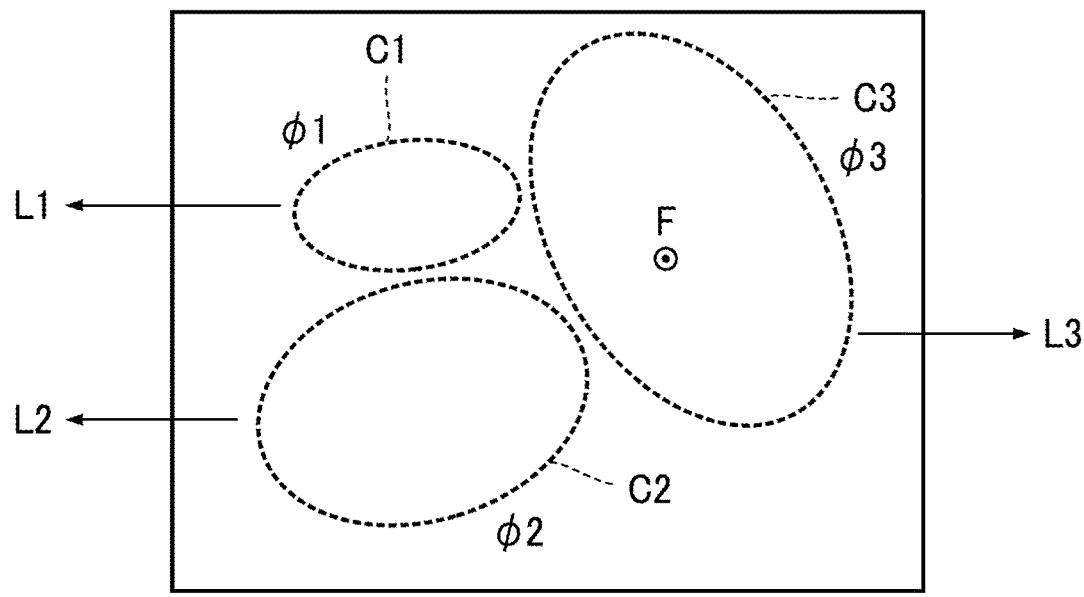
FIG. 4 is an explanatory diagram of an identification model.

In the above embodiment, the support vector machine, which determines which one of two scene types S a feature amount F corresponds to, is given as an example of the identification model M. In another embodiment, a mixture distribution represented in the form of a weighted sum of probability distributions is used as an identification model M (in other words, a mixture distribution model is used). FIG. 4 is an explanatory diagram of an identification model M according to the embodiment. For convenience of description, a two-dimensional space is shown in FIG. 4 as a vector space in which a feature amount F may be present. As shown in FIG. 4, the identification model M according to the embodiment is a mixture distribution composed of K probability distributions $\varphi 1$ to $\varphi K$ corresponding to respective ones of K different types (K=3 in the case of FIG. 4) of scenes S1 to SK. For example, a mixture normal distribution (Gaussian mixture model) with a probability distribution $\varphi k$ (k=1 to K) as a normal distribution may be used as the identification model M. The identification model M is generated by use of machine learning and reflects relations between feature amounts F and scene types Sk in existing voluminous content pieces.

As shown in FIG. 4, an analysis processor 32 according to the embodiment calculates likelihoods Lk (L1 to LK) corresponding to K scene types S1 to SK on the basis of feature amounts F extracted by a feature extractor 31 for different unit periods. In other words, K likelihoods L1 to LK corresponding to different scene types Sk are sequentially calculated for each unit period. A likelihood Lk corresponding to a scene type Sk is an index that is indicative of an accuracy by which a feature amount F is observable under a probability distribution φk of the scene type Sk. In other words, the higher the possibility in content that a unit period in which a feature amount F is extracted corresponds to a scene type Sk, the greater a numerical value that is set for the likelihood Lk corresponding to the scene type Sk. As will be understood from the foregoing description, the identification model M according to the embodiment is a statistical model, by use of which a likelihood Lk relating to each of K scene types S1 to SK can be identified from a single feature amount F of audio in content.

A storage device 22 according to the embodiment stores K pieces of playback control data Q1 to QK respectively corresponding to K scene types S1 to SK. A setting processor 33 according to the embodiment sets playback control data Q depending on a likelihood Lk calculated for each scene type Sk by the analysis processor 32. More specifically, the setting processor 33 generates playback control data Q (audio control data Qa and video control data Qv) such that, the greater a likelihood Lk calculated by the analysis processor 32 is, the closer the playback control data Q is to the content of the playback control data Qk of a scene type Sk corresponding to the likelihood Lk. For example, a weighted sum of K pieces of audio control data Qa obtained by using each corresponding likelihood Lk as a weighting factor is indicated to the audio processor 242 as audio control data Qa; and a weighted sum of K pieces of video control data Qv obtained by using each corresponding likelihood Lk as a weighting factor is indicated to the video processor 244 as video control data Qv. Accordingly, audio control data Qa of a scene type Sk having a higher likelihood Lk from among the K pieces of audio control data Qa is more dominantly reflected in a sound field formed in accordance with sound output using the sound output system 12. Likewise, video control data Qv of a scene type Sk having a higher likelihood Lk from among the K pieces of video control data Qv is more dominantly reflected in video displayed on the display 13.

Figure 5:
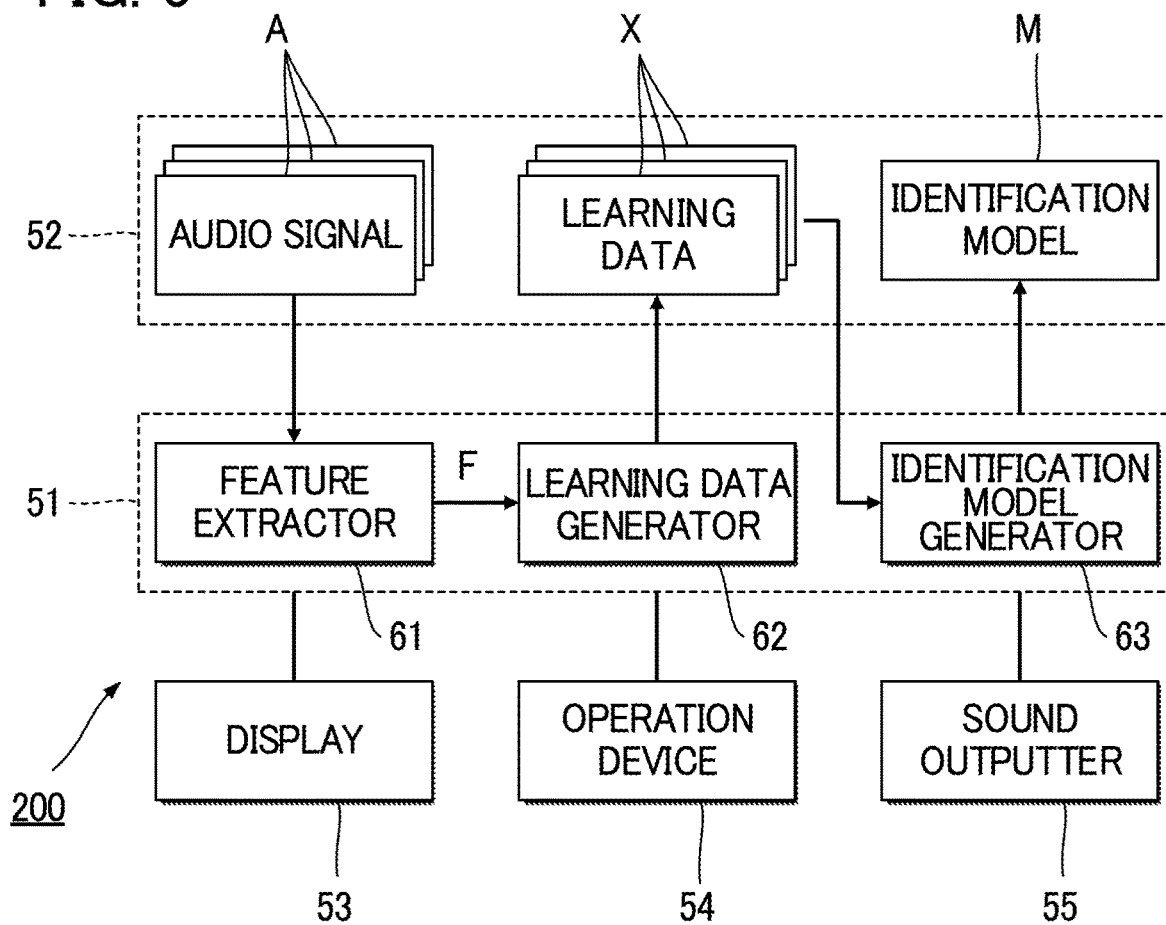
FIG. 5 is a block diagram of an information processing apparatus.

FIG. 5 is a block diagram of an information processing apparatus 200 according to another embodiment. The information processing apparatus 200 is a computer system (an identification model generating apparatus) that generates an identification model M used in the above embodiments. For example, a portable terminal apparatus, such as a mobile phone or a smartphone, or an information apparatus, such as a personal computer, is used as the information processing apparatus 200.

As shown in FIG. 5, the information processing apparatus 200 includes a control device 51, a storage device 52, a display 53, an operation device 54, and a sound outputter 55. The display 53, for example, has a liquid crystal display panel on which there is displayed an image indicated by the control device 51. The operation device 54 is an input device that receives an input operation from a user. More specifically, operators that can be operated by a user or a touch panel that detects contact on a display surface of the display 53 may be used as the operation device 54.

The control device 51 is configured to include processing circuitry, such as a CPU, for example, and integrally controls each element of the information processing apparatus 200. The storage device 52 stores a computer program executed by the control device 51 and various kinds of data used by the control device 51. For example, a known recording medium, such as a semiconductor recording medium or a magnetic recording medium, or a combination of multiple types of recording media may be employed as the storage device 52 in a freely-selected manner. A storage device 52 (for example, a cloud storage) may be provided separately from the information processing apparatus 100, and the control device 51 may execute data reading and writing from and into the storage device 52 via a communication network, such as the Internet. The storage device 52 according to the embodiment stores an audio signal A of N channels for each of multiple pieces of content, each content including various scenes.

As shown in FIG. 5, the control device 51 according to the embodiment executes a computer program stored in the storage device 52, thereby functioning as elements for generating an identification model M (a feature extractor 61, a learning data generator 62, and an identification model generator 63). A part of the functions of the control device 51 may be realized using dedicated electronic circuitry or the functions of the control device 51 may be distributed among devices is also employed.

The feature extractor 61 extracts a feature amount F for each unit period for each of audio signals A stored in the storage device 52. Similarly to the above embodiment, a feature amount F extracted by the feature extractor 61 is a feature vector composed of N elements that depend on corresponding frequency characteristics (for example, MFCC) of N channels.

The learning data generator 62 generates multiple pieces of learning data X used for machine learning for generation of an identification model M. The learning data generator 62 generates multiple pieces of learning data X corresponding to different feature amounts F extracted by the feature extractor 61. Each piece of learning data X includes a feature amount F and a scene type S. More specifically, a piece of learning data X is teacher data (correct-answer data) in which a feature amount F extracted from an audio signal A and a proper scene type S are associated with each other, where the proper scene type S is relevant to a part of content corresponding to the audio signal A, and from which part the feature amount F is extracted. In other words, the learning data X is teacher data in which a label indicative of a scene type S that is a correct answer is appended to a feature amount F. The learning data generator 62 according to the embodiment sets a scene type S for association with a feature amount F in each piece of learning data X in accordance with an instruction input to the operation device 54 by a user.

The identification model generator 63 generates an identification model M by performing machine learning with use of the multiple pieces of learning data X generated by the learning data generator 62. The identification model M generated by the identification model generator 63 is transmitted to the storage device 22 of the information processing apparatus 100 and, as described above, is used for identifying a scene type S by the analysis processor 32. The identification model M is transmitted to the information processing apparatus 100 via a communication network, such as the Internet, for example. In addition, the identification model M may be transmitted from the information processing apparatus 200 to the information processing apparatus 100 using a portable recording medium, such as a semiconductor recording medium.

Figure 6:
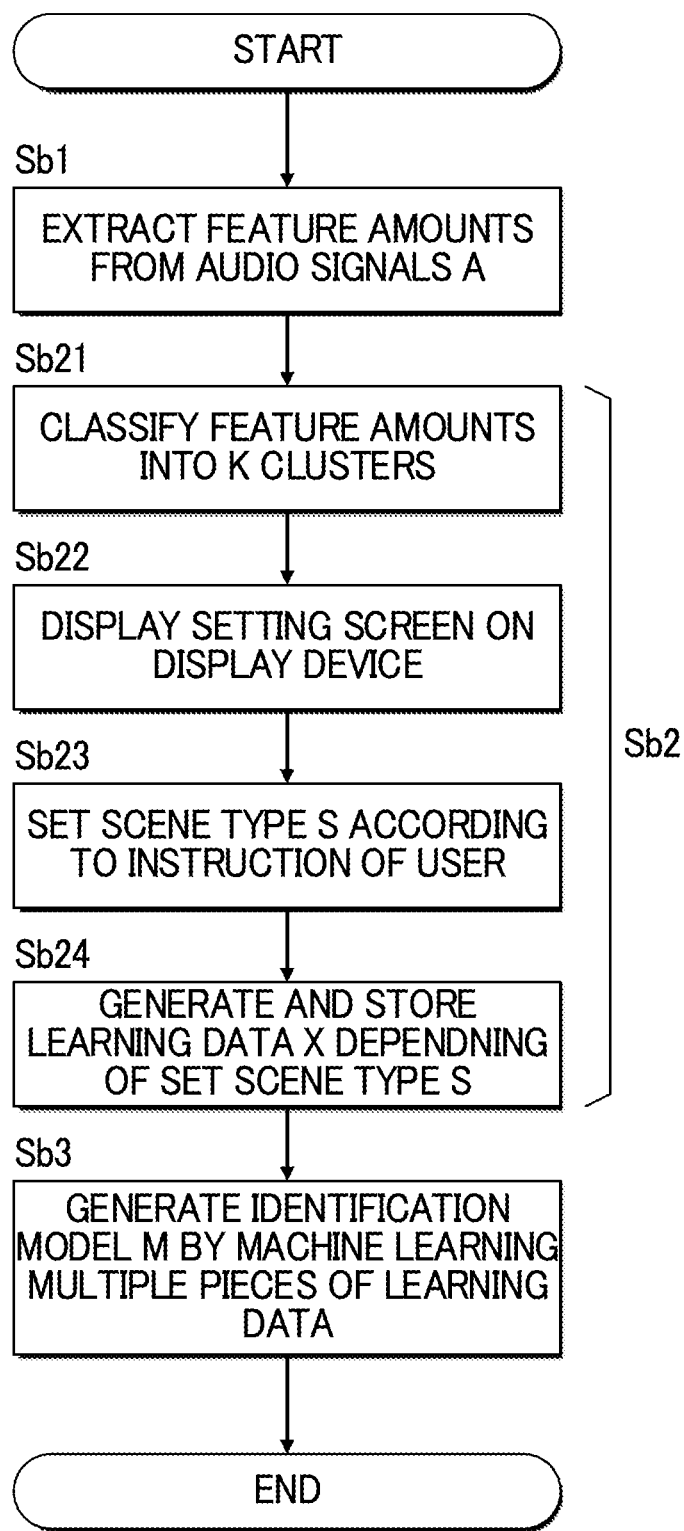
FIG. 6 is a flowchart showing a process executed by a control device.

FIG. 6 is a flowchart illustrating a process (an identification model generating method) executed by the control device 51 according to the embodiment. The process illustrated in FIG. 6 is started, triggered by an instruction input to the operation device 54 by a user.

When the process of FIG. 6 starts, the feature extractor 61 extracts a feature amount F for each unit period from each of audio signals A stored in the storage device 52 (Sb1). The learning data generator 62 generates multiple pieces of learning data X corresponding to respective ones of the feature amounts F extracted by the feature extractor 61 (Sb2: learning data generating process). The identification model generator 63 generates an identification model M by performing machine learning by use of the multiple pieces of learning data X generated by the learning data generator 62 and stores the generated identification model M in the storage device 52 (Sb3).

Specific details of the learning data generating process Sb2 (the learning data generating method) executed by the learning data generator 62 will now be described. When the learning data generating process Sb2 starts, the learning data generator 62 classifies feature amounts F extracted by the feature extractor 61 in Step Sb1 into K clusters (subsets) C (Sb21). For classification of feature amounts F, a known cluster analyzing technology may be freely employed. The total number K of clusters is either a variable value or a fixed value.

Figure 7:
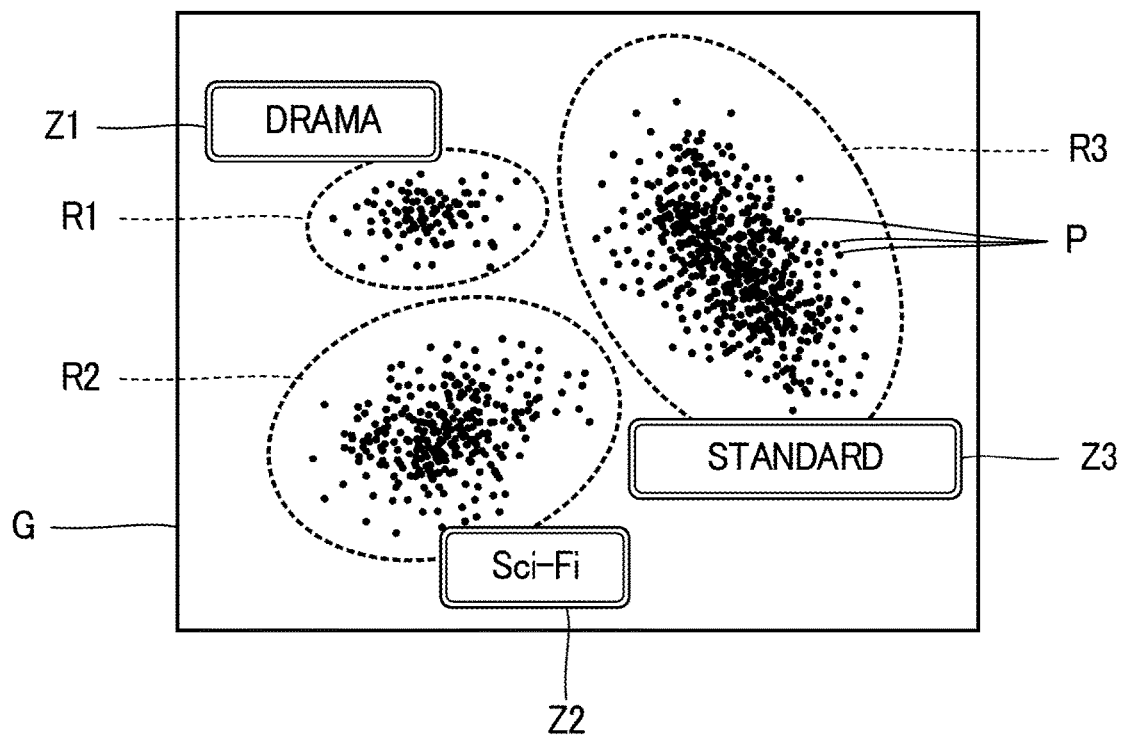
FIG. 7 is a schematic view of a setting screen.

The learning data generator 62 displays on the display 53 (Sb22) an image G (hereafter, a "setting screen"), which is representative of a result of the classification of feature amounts F. FIG. 7 is a schematic view of the setting screen G. As shown in FIG. 7, the setting screen G is an image that is representative of a distribution of feature amounts F in a two-dimensional space. More specifically, the setting screen G includes feature images P each representative of each feature amount F, and range images R (R1, R2, . . . ) each representative of each cluster C. The feature images P of feature amounts F corresponding to a same scene type S are locally distributed within a range corresponding to one cluster C (i.e., clustered). A range image R corresponding to any one cluster C has a closed figure (for example, an oval shape) enclosing an area in which the feature images P of feature amounts F classified into the cluster C are distributed.

By appropriately operating the operation device 54, a user can select any cluster C (more specifically, a range image R) on the setting screen G, to designate a desired scene type S for the cluster C. In other words, a user labels a desired scene type S for feature amounts F belonging to a freely-selected cluster C. A user's instruction for a scene type S is repeated for each of the clusters C. In accordance with an instruction from a user described above, the learning data generator 62 sets a scene type S for each of the clusters C (Sb23). As shown in FIG. 7, a type image Z (Z1, Z2, . . . ) representative of a scene type S set for a cluster C is disposed near the range image R of the cluster C.

In addition, in a case where a cluster C is selected by a user, a section of the content that corresponds to a feature amount F belonging to the cluster C (hereafter, a "playback section") may be played back by use of the sound outputter 55. A playback section is, for example, in content, a section including a unit period in which the feature amount F has been extracted. More specifically, the learning data generator 62 supplies the playback section, in which the feature amount F has been extracted, of the audio signal A to the sound outputter 55, thereby playing back the audio. A user can estimate a scene type S of the playback section by listening to the playback sound played using the sound outputter 55. In a case in which the feature image P of any one feature amount F is selected by a user, a playback section corresponding to the feature amount F may be played back by the sound outputter 55. A configuration for allowing a user to select a scene type S of each cluster C may be freely selected. For example, a scene type S of each cluster C may be set by allowing a user to sequentially answer a condition for each cluster C on an interactive basis.

The learning data generator 62 generates multiple pieces of learning data X on the basis of the set scene type S for each cluster C (Sb24). More specifically, a piece of learning data X is generated for each of feature amounts F, where such learning data X includes an association of a feature amount F extracted by the feature extractor 61 and a scene type S set for a cluster C to which the feature amount F belongs. A same scene type S is set to those feature amounts F that are similar to one another and classified into one cluster C. As will be understood from the foregoing description, the learning data generator 62 according to the embodiment sets a scene type S in accordance with an instruction from a user that indicates one of clusters C classifying feature amounts F extracted from an audio signal A representative of content, thereby generating learning data X representative of a feature amount F belonging to the cluster C and the scene type S set for the cluster C.

As described above, according to the embodiment, learning data X representative of a feature amount F of audio in content and a scene type S of the content is generated. Accordingly, even in a case where a scene type S cannot be accurately identified from video in content, a scene type S of the content can be identified using an identification model M generated by machine learning using the learning data X. In addition, since multiple pieces of learning data X, each representative of a feature amount F belonging to each cluster C and a scene type S set to the cluster C in accordance with an instruction from a user, are generated, an advantage is also obtained in that an identification model M that reflects a user's intention or preference can be generated.

Modifications

The embodiments described may be variously modified. Specific modes of modifications are illustrated below. Two or more modes freely selected from the following exemplary illustrations may be appropriately combined in such a manner that they are not contradictory.

(1) In each of the embodiments described above, a scene type S is identified for each unit period. In such a configuration, a scene type S (and playback control data Q) may frequently change within a short period. Accordingly, a configuration for inhibiting frequent changes in the scene type S may be envisaged. For example, for each of unit periods, a scene type S may be selected that has a highest frequency in a predetermined number of unit periods that include the subject unit period and those periods that precede and follow the subject unit period. According to the configuration described above, an instant change of the scene type S can be inhibited.

(2) Although both audio and video in content are focused on in the above embodiments, elements relating to the video may be omitted. For example, in the above embodiments, the video processor 244 (or the video control data Qv) and the display 13 may be omitted.

(3) In the embodiments described above, a feature amount F is in the form of a feature vector in which elements corresponding to frequency characteristics of an audio signal A1 are arranged for N channels. However, types of feature amounts F are not limited to the examples described above. For example, a Chroma vector (PCP: Pitch Class Profiles) including elements corresponding to different pitch classes (for example, the twelve half tones of the equal temperament scale) may be used as a feature amount F. In the Chroma vector, an element corresponding to a pitch class is set to have a value acquired by adding or averaging signal intensities of a band component corresponding to the pitch class in an audio signal A1 across octaves. An N-dimensional vector in which elements corresponding to signal intensities (levels) of an audio signal A1 are arranged for N channels may be used as a feature amount F. It is of note that all the channels of the audio signal A1 need not be used for extracting feature amounts F. For example, a feature amount F may be extracted from any one of N-channel audio signals A1.

(4) A support vector machine is illustrated as an identification model M in the above embodiment, and a mixture distribution model (for example, a Gaussian mixture model) is illustrated as an identification model M in the above embodiment. However, a type of the identification model M is not limited to those described above. For example, one of various pattern recognition models, such as a neural network, Bayesian classification, or the like may be used as an identification model M. As will be understood from the above illustrations, an identification model M is comprehensively expressed as a statistical model representative of relations between feature amounts F of audio and scene types S. More specifically, an identification model M is configured to determine a scene type S having high validity for a feature amount F fed to the identification model M, under a condition that satisfies relations between feature amounts F and scene types S in existing voluminous content pieces.

(5) A server apparatus communicating with a terminal apparatus (for example, a mobile phone or a smartphone) via a communication network, such as a mobile communication network or the Internet, may be caused to execute at least a part of the functions of the information processing apparatus 100 according to the above embodiments.

Figure 8:
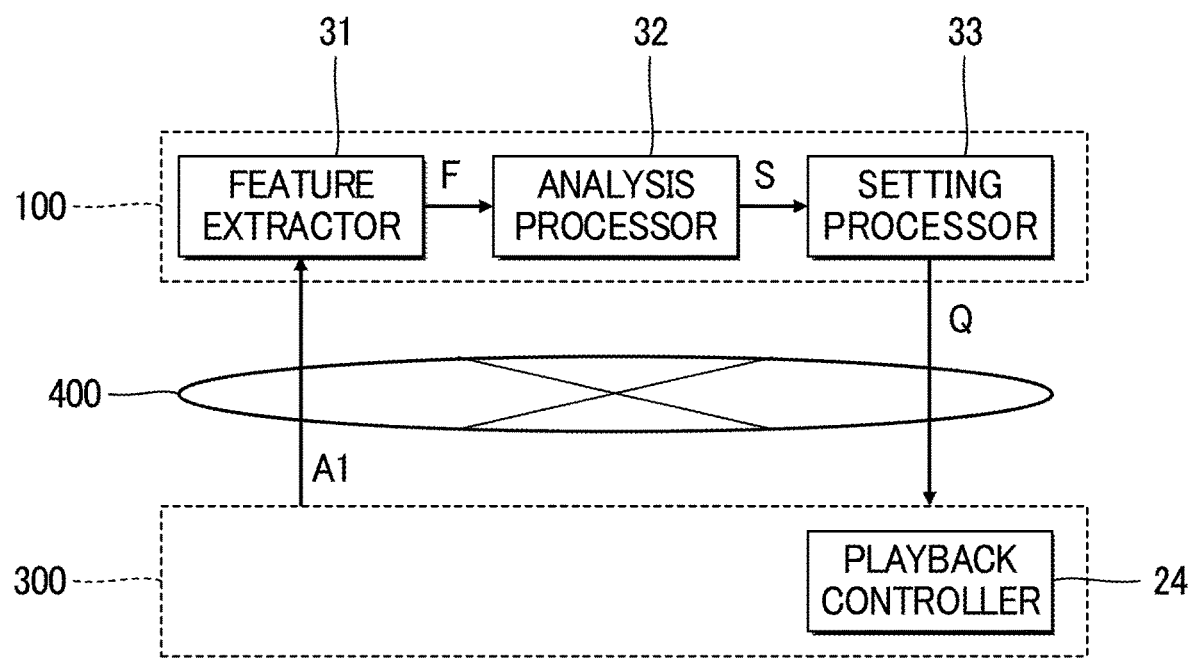
FIG. 8 is a block diagram of an information processing apparatus.

For example, as shown in FIG. 8, the feature extractor 31, the analysis processor 32, and the setting processor 33 are installed in the information processing apparatus 100 (for example, a web server), which is communicable with the terminal apparatus 300. The feature extractor 31 receives an audio signal A1 from the terminal apparatus 300 via a communication network 400 and extracts a feature amount F from the audio signal A1 (Sa1). The analysis processor 32, similarly to each embodiment described above, identifies a scene type S from the feature amount F (Sa2). The setting processor 33 sets playback control data Q in accordance with the scene type S and transmits the playback control data Q to the terminal apparatus 300 (Sa3). The playback controller 24, which executes a process using playback control data Q, is mounted in the terminal apparatus 300.

The feature extractor 31 may instead be installed in the terminal apparatus 300, such that a feature amount F extracted by the feature extractor 31 is transmitted from the terminal apparatus 300 to the information processing apparatus 100. In this case, the feature extractor 31 is omitted from the information processing apparatus 100. The analysis processor 32 identifies a scene type S on the basis of the feature amount F received from the terminal apparatus 300. The setting processor 33 may instead be installed in the terminal apparatus 300, in which case the setting processor 33 is omitted from the information processing apparatus 100. The analysis processor 32 notifies the setting processor 33 of the terminal apparatus 300 of the scene type S identified from the feature amount F. The playback controller 24 may be installed in the information processing apparatus 100, such that an audio signal A2 and a video signal V2 after being processed by the playback controller 24 are transmitted to the terminal apparatus 300.

(6) At least a part of the functions of the information processing apparatus 200 according to the embodiment may be realized by an external device provided separately from the information processing apparatus 200. For example, under a configuration in which the information processing apparatus 200 is realized by a terminal apparatus, such as a mobile phone or a smartphone, the feature extractor 61 is installed in a server apparatus that is communicable with the terminal apparatus. In other words, the feature extractor 61 is omitted from the information processing apparatus 200. In addition, the functions of the embodiment for generating an identification model M may be mounted in the information processing apparatus 100 according to the above embodiments.

(7) Although a scene type S is identified from a feature amount F of audio in content in the embodiments described above, a scene type S may be identified from a feature amount F of audio in content and a feature amount of video in the content. In other words, a configuration for identifying a scene type S with a feature amount of video that is taken into account in addition to a feature amount F of audio is not excluded from the scope of the present disclosure.

(8) The information processing apparatus 100 according to the above embodiments is realized by the control device 21 operating in coordination with a computer program. Each of computer programs understood from the above embodiments causes a computer to execute an analysis process (Sa2) for identifying a scene type S of content that includes video and audio in accordance with a feature amount F of the audio in the content. A computer program according to another aspect causes a computer to execute a setting process (Sa3) for setting playback control data Q for controlling playback of content in accordance with the scene type S identified in the analysis process.

The information processing apparatus 200 according to the embodiment, as described above, is realized by the control device 51 operating in coordination with a computer program. By setting a scene type S in accordance with an instruction from a user to indicate one of clusters C classifying feature amounts F of audio in one or more pieces of content, a computer program derived from the embodiment executes a learning data generating process (Sb2) of generating pieces of learning data X, each representative of a feature amount F belonging to the cluster C and a scene type S set for the cluster C and an identification model generating process (Sb3) of generating an identification model M representative of relations between feature amounts F of audio and scene types S, by performing machine learning with use of the pieces of learning data X.

A computer program according to each aspect illustrated above is provided in a form that is stored in a computer-readable recording medium and is installed in a computer. The recording medium is, for example, a non-transitory recording medium, and is preferably an optical recording medium (optical disc) such as a CD-ROM. However, the recording medium may be provided in any known media format such as a semiconductor recording medium or a magnetic recording medium. It is of note that the non-transitory recording medium includes a freely-selected recording medium other than a transitory propagation signal, and a volatile recording medium may also be used. Furthermore, a computer program may be distributed to the computer via a communication network.

(9) For example, the following aspects are derivable from the embodiments and modifications illustrated above (particularly, the above embodiments).

An information processing method according to an aspect (aspect A1) of the present disclosure identifies a scene type of content that includes audio and video in accordance with a feature amount of the audio in the content. In the aspect described above, since a scene type is identified in accordance with the feature amount of the audio in the content, the scene type of the content can be identified even in a case where a scene type cannot be accurately identified from the video in the content.

In an example (aspect A2) of the aspect A1, identifying a scene type includes identifying the scene type of the content from the feature amount of the audio in the content using an identification model representative of relations between feature amounts of the audio and scene types. In the aspect described above, the identification model representative of relations between the feature amounts of the audio and the scene types is used for identifying a scene type. Accordingly, under a tendency assumed between the feature amount of the audio and the scene type, a scene type having high validity can be identified for a feature amount extracted by the feature extractor.

According to an example (aspect A3) of the aspect A2, the identification model is a statistical model for identifying one scene type from the feature amount of the audio in the content. According to the aspect described above, one scene type can be identified from a feature amount of the audio in the content.

In an example (aspect A4) of the aspect A2, the identification model is a statistical model that identifies a likelihood relating to each of the scene types from a feature amount of audio in content. According to the aspect described above, a likelihood for each of the scene types can be identified from the feature amount of the audio in the content.

In an example (aspect A5) of any one of the aspects A1 to A4, playback control data for controlling playback of the content is set in accordance with the identified scene type. In the aspect described above, the playback control data for controlling playback of the content is set in accordance with a scene type. Accordingly, content can be played back with characteristics appropriate for the scene type of the content.

In an example (aspect A6) of the aspect A5, the playback control data includes audio control data for controlling a sound field formed by the audio in the content. In the aspect described above, audio control data for controlling a sound field formed by the audio in the content is set in accordance with the scene type. Accordingly, the audio in the content can be played back with a sound field appropriate for the scene type of the content.

An information processing method according to an aspect of the present disclosure (aspect A7) sets playback control data for controlling playback of content that includes video and audio in accordance with a scene type of content that is identified from a feature amount of the audio in the content. In the aspect described above, playback control data for controlling playback of content is set in accordance with a scene type identified from the feature amount of the audio in the content. Accordingly, even in a case where a scene type cannot be accurately identified from video in the content, the scene type of the content can be identified, and as a result the content can be played back with characteristics appropriate for the scene type.

In an example (aspect A8) of any one of the aspects A1 to A7, the feature amount is a vector including elements each of which corresponds to a corresponding one of respective channels representative of the audio in the content, and each of the elements is a numerical value depending on frequency characteristics of a channel that corresponds to the element from among the channels. In the aspect described above, a scene type is identified by using, as a feature amount, a vector including an element corresponding to frequency characteristics of each of the channels. In other words, a feature amount representative of a feature of a sound field realized by audio signals of channels is used for identifying a scene type. Accordingly, under a tendency in which a feature of a sound field realized by an audio signal with multiple channels depends on the scene type, a content of the scene type can be identified with high accuracy.

An information processing apparatus according to an aspect of the present disclosure (aspect A9) includes an analyzer that identifies a scene type of content including video and audio in accordance with a feature amount of the audio in the content. In the aspect described above, a scene type is identified in accordance with a feature amount of audio in content, and accordingly, even in a case where the scene type cannot be accurately identified from video in the content, the scene type of the content can be identified.

The information processing apparatus according to an example (aspect A10) of the aspect A9 further includes: a setter that sets playback control data for controlling playback of the content in accordance with the scene type identified by the analyzer; and a playback controller that plays back the content in accordance with the playback control data set by the setter. In the aspect described above, playback control data for controlling playback of content is set in accordance with a scene type. Accordingly, content can be played back with characteristics appropriate for the scene type of the content.

(10) From the configurations illustrated above (particularly, the embodiment), for example, the following aspects are derivable.

An information processing method according to an aspect (aspect B1) of the present disclosure, by setting one of scene types in accordance with an instruction from a user to indicate one of clusters classifying feature amounts of audio in one or more pieces of content, generates a plurality of pieces of learning data, each representative of a feature amount, from among the feature amounts, that belongs to the cluster and the scene type set for the cluster. In the aspect described above, pieces of learning data each representative of a feature amount of audio in content and a scene type of the content are generated. Accordingly, by using an identification model generated by performing machine learning by use of a plurality of pieces of learning data, the scene type of the content can be identified even in a case in which a scene type cannot be accurately identified from video in content. In addition, since a plurality of pieces of learning data each representative of a feature amount belonging to one cluster and a scene type set for the cluster in accordance with an instruction from a user is generated, an advantage is obtained in that it is possible to generate an identification model in which a user's intention or preference is reflected.

In an example (aspect B2) of the aspect B1, an identification model representative of relations between feature amounts of audio and the scene types is generated by performing machine learning using the plurality of pieces of learning data. In the aspect described above, a plurality of pieces of learning data each representative of a feature amount of audio in content and a scene type of the content is generated, and an identification model is generated by performing machine learning by use of the plurality of pieces of learning data. By using this identification model, even in a case in which a scene type cannot be accurately identified from video in content, a scene type of the content can be identified.

In an example (aspect B3) of the aspect B2, the identification model is a statistical model identifying one scene type from a feature amount of audio in content. According to the aspect described above, one scene type can be identified from the feature amount of the audio in the content.

In an example (aspect B4) of the aspect B2, the identification model described above is a statistical model that identifies a likelihood relating to each of the scene types from a feature amount of audio in content. According to the aspect described above, a likelihood relating to each scene type can be identified from a feature amount of the audio in the content.

In an example (aspect B5) of any one of the aspects B1 to B4, the scene type is a classification of a scene represented by the content.

An information processing apparatus according to an aspect (aspect B6) of the present disclosure includes a learning data generator that, by setting one of scene types in accordance with an instruction from a user to indicate one of clusters classifying feature amounts of audio in one or more pieces of content, generates a plurality of pieces of learning data, each representative of a feature amount, from among the feature amounts, that belongs to the cluster and a scene type set for the cluster; and an identification model generator that generates an identification model representative of relations between the feature amounts of audio and the scene types by performing machine learning using the plurality of pieces of learning data. According to the aspect described above, a plurality of pieces of learning data each representative of a feature amount of audio in content and a scene type of the content is generated, and an identification model is generated by performing machine learning using the plurality of pieces of learning data. Accordingly, by using this identification model, even in a case in which a scene type cannot be accurately identified from video in content, the scene type of the content can be identified. In addition, since a plurality of learning data each representative of feature amounts belonging to one cluster and a scene type set for the cluster in accordance with an instruction from a user is generated, an advantage also is obtained in that it is possible to generate an identification model in which a user's intention or preference is reflected.

DESCRIPTION OF REFERENCE SIGNS

10 AV system
100, 200 information processing apparatus
300 terminal apparatus
400 communication network
11 signal supplier
12 sound output system
13 display
21 control device
22 storage device
23 signal acquirer
24 playback controller
242 audio processor
244 video processor
31 feature extractor
32 analysis processor
33 setting processor
51 control device
52 storage device
53 display
54 operation device
55 sound outputter
61 feature extractor
62 learning data generator
63 identification model generator The foregoing disclosure has been set forth merely to illustrate the embodiments of the invention and is not intended to be limiting. Since modifications of the disclosed embodiments incorporating the spirit and substance of the invention may occur to persons having ordinary skill in the art, the invention should be construed to include everything within the scope of the appended claims as well as equivalents thereof.

What is claimed is:

1. An apparatus for generating relations between feature amounts of audio and scene types, comprising:
   at least one processor; and
   a memory that is operatively coupled to the at least one processor, the memory storing instructions executable by the processor, wherein upon execution of the instructions the processor is caused to:
   set one of the scene types in accordance with an instruction from a user to indicate one of clusters classifying the feature amounts of audio in one or more pieces of content;
   generate a plurality of pieces of learning data, each representative of a feature amount, from among the feature amounts, that belongs to the cluster and the scene type set for the cluster; and
   generate an identification model representative of relations between the feature amounts of audio and the scene types by performing machine learning using the plurality of pieces of learning data.

2. The apparatus according to claim 1, wherein the identification model is a statistical model identifying one scene type from a feature amount of audio in content.

3. The apparatus according to claim 1, wherein the identification model is a statistical model that identifies a likelihood relating to each of the scene types from a feature amount of audio in content.

4. The apparatus according to claim 1, wherein the scene type is a classification of a scene represented by the content.

5. A method for generating relations between feature amounts of audio and scene types comprising:
   setting one of the scene types in accordance with an instruction from a user to indicate one of clusters classifying the feature amounts of audio in one or more pieces of content; and
   generating a plurality of pieces of learning data, each representative of a feature amount, from among the feature amounts, that belongs to the cluster and the scene type set for the cluster.

6. The method according to claim 5, further comprising:
   generating an identification model representative of relations between the feature amounts of audio and the scene types by performing machine learning using the plurality of pieces of learning data.

7. The method according to claim 6, wherein the identification model is a statistical model identifying one scene type from a feature amount of audio in content.

8. The method according to claim 6, wherein the identification model is a statistical model that identifies a likelihood relating to each of the scene types from a feature amount of audio in content.

9. The method according to claim 5, wherein the scene type is a classification of a scene represented by the content.

* * * * *